Aug. 26, 1969     L. J. BROOKS, JR     3,463,276
AUXILIARY BRAKE SYSTEM

Filed Oct. 5, 1967     7 Sheets-Sheet 1

INVENTOR
LOUIE J. BROOKS JR.

BY *Larson and Taylor*

ATTORNEYS

Aug. 26, 1969 L. J. BROOKS, JR 3,463,276
AUXILIARY BRAKE SYSTEM
Filed Oct. 5, 1967 7 Sheets-Sheet 2

INVENTOR
LOUIE J. BROOKS, JR.

BY *Larson and Taylor*
ATTORNEYS

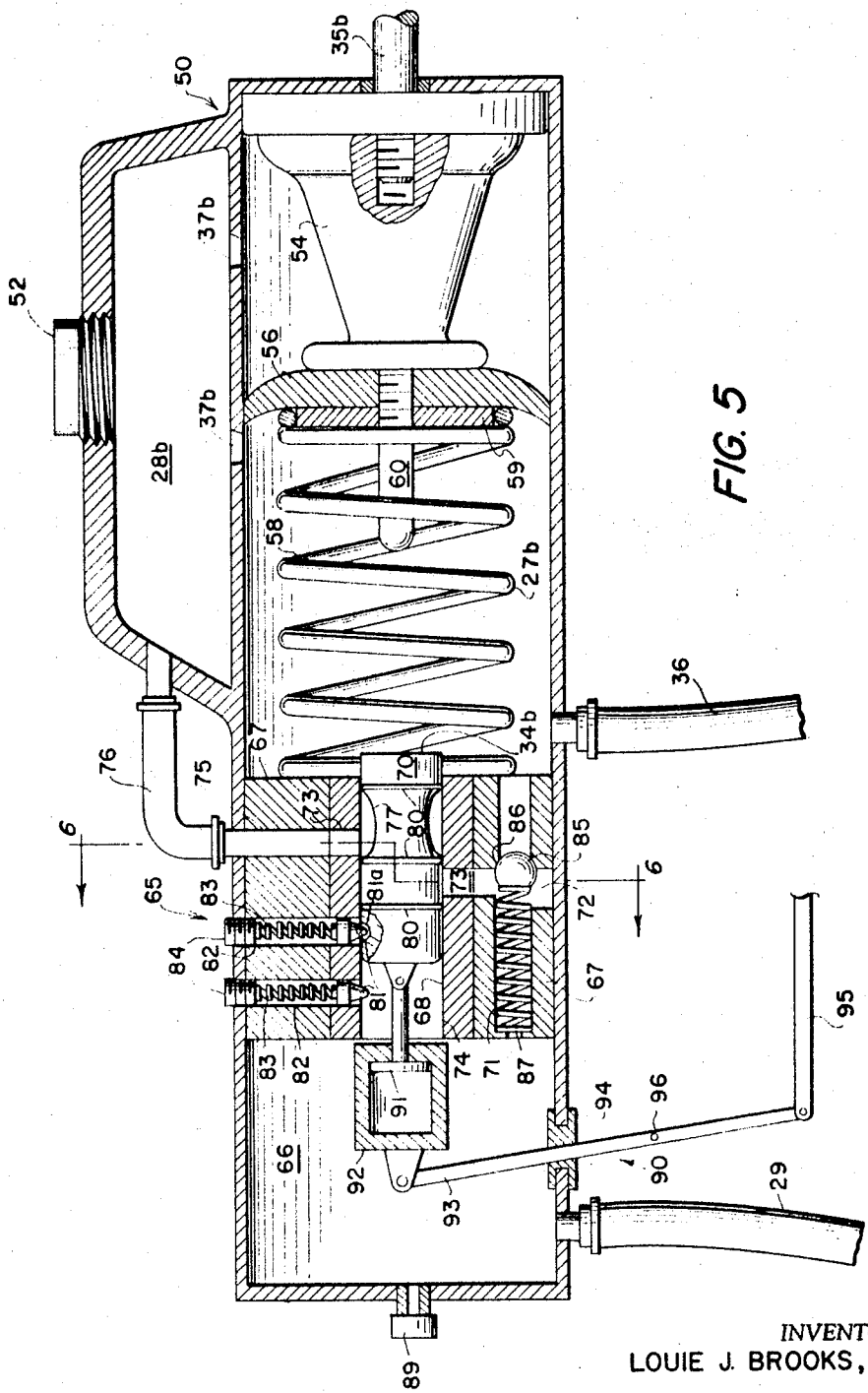

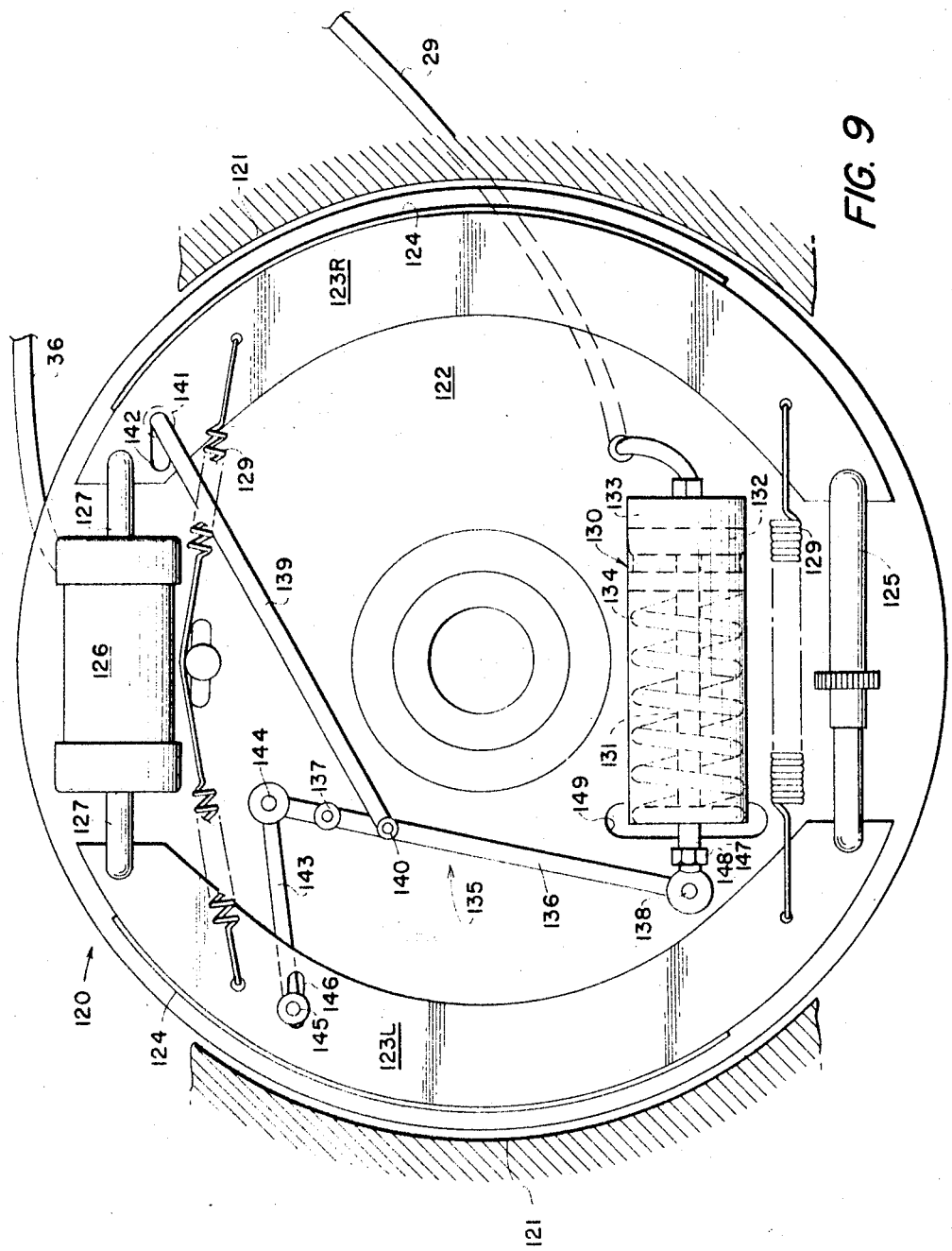

Aug. 26, 1969   L. J. BROOKS, JR   3,463,276
AUXILIARY BRAKE SYSTEM
Filed Oct. 5, 1967   7 Sheets-Sheet 5
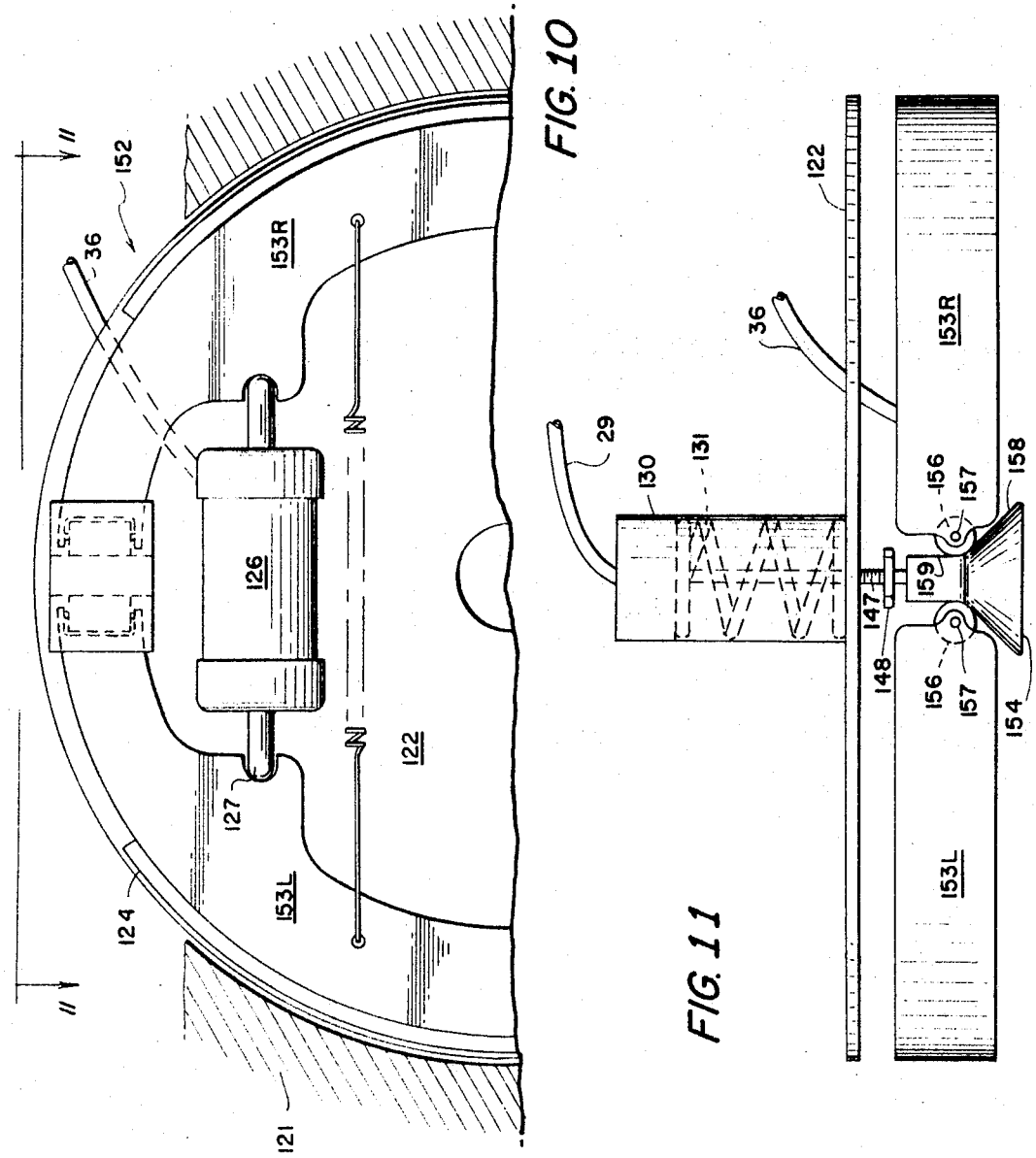
INVENTOR
LOUIE J. BROOKS, JR.
BY Larson and Taylor
ATTORNEYS

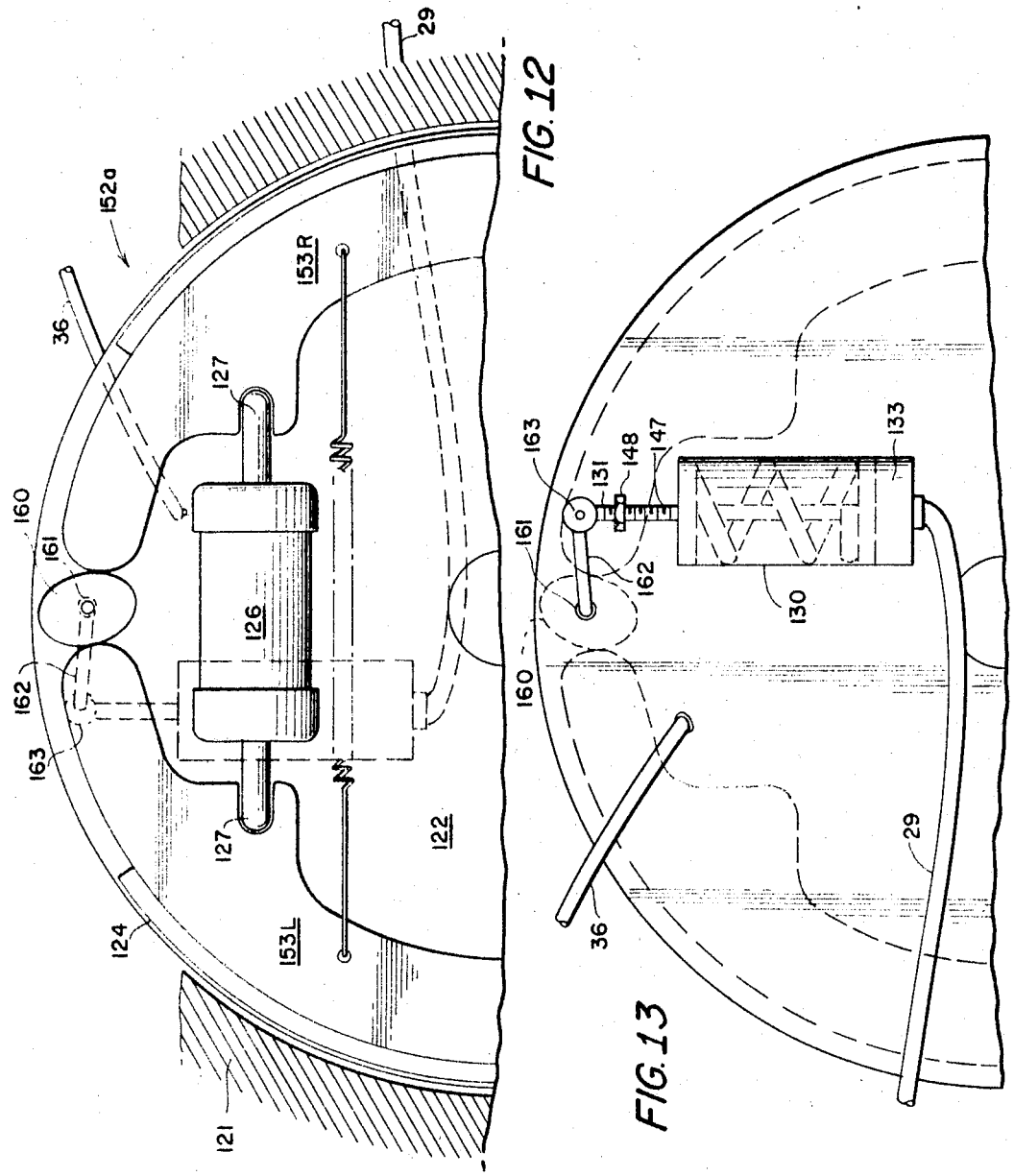

Aug. 26, 1969  L. J. BROOKS, JR  3,463,276
AUXILIARY BRAKE SYSTEM
Filed Oct. 5, 1967  7 Sheets-Sheet 7

INVENTOR
LOUIE J. BROOKS, JR.

BY Larson and Taylor
ATTORNEYS

United States Patent Office 3,463,276
Patented Aug. 26, 1969

3,463,276
AUXILIARY BRAKE SYSTEM
Louie J. Brooks, Jr., 128 Knox Drive,
Marietta, Ga. 30060
Filed Oct. 5, 1967, Ser. No. 673,036
Int. Cl. F16d 65/14; B61h 13/00
U.S. Cl. 188—106    31 Claims

ABSTRACT OF THE DISCLOSURE

An auxiliary fluid brake system including a cylinder which, when loaded by fluid under pressure permits normal operation of a brake by a main brake actuator; and which, upon release of the pressurized fluid through a control valve to a reservoir, causes engagement of the brake either as an emergency safety brake or as a parking brake. Pressurized fluid may be supplied to the system through a suitable one-way valve from main fluid brake systems such as a fluid power brake or from the master cylinder of a conventional brake. The system includes various linkage means between the cylinder and the brake elements to permit operation of the invention on either a cylindrical drum brake or a disc brake.

BACKGROUND

Field of the invention

This invention relates to fluid brake systems, and in particular, it relates to an auxiliary brake system for use with a main brake system as a safety brake and/or as a parking brake.

Description of the prior art

Applicant is aware of no prior art showing an auxiliary fluid system for use with a main system and capable of serving both as a parking brake and a safety brake.

One problem to which the present invention is directed, namely, that of providing a safety device for a main fluid brake system, has been recognized. It is known that a fluid brake system suffers from the disadvantage that a leak at any part in the system will cause a pressure loss in the entire system thereby rendering the entire system inoperative. Previous attempts to solve this problem have involved isolating damaged portions of the system so that a leak or damage at one portion in the system would not affect the remainder of the system.

SUMMARY OF THE INVENTION

Broadly, the auxiliary fluid system of the present invention includes an auxiliary fluid brake cylinder normally under pressure and arranged to cause engagement of the brake upon release of pressure from the cylinder and a suitable mechanism operable either at will or semi-automatically upon failure of the main brake system for releasing the pressure from the cylinder.

The present invention is normally employed in conjunction with a conventional brake actuated by a main actuator. The auxiliary fluid cylinder of the present invention is mounted so that the cylinder is movable at least between a first position whereat the cylinder permits the brake to be operated by the main brake actuator and a second position whereat the auxiliary brake cylinder causes the brake elements to engage. The invention also includes a source of pressurized fluid connected to the auxiliary cylinder by a one-way valve and a low pressure fluid reservoir connected to the auxiliary cylinder through a control release valve. Means for opening the control release valve would include either (1) means strategically located to open the valve upon failure of the main brake system and/or (2) suitable linkage means providing simple manual opening of the valve at will so that the auxiliary fluid system can also serve as a parking brake.

To restore pressurized fluid to the auxiliary fluid cylinder a suitable means would be provided to cause pressurized fluid to flow from said source of pressurized fluid through the said one-way valve into the auxiliary fluid cylinder.

In a preferred application of the present invention to an automotive vehicle having a conventional fluid operated main braking system, the means for opening the control valve could include a first mechanism operable by panic movement of the brake pedal to the floor upon failure of the main brake and/or a dashboard control knob operable at will. The means for supplying or restoring pressurized fluid to the system could include the brake pedal itself. That is, because of the one-way valve, whenever the auxiliary system is at low pressure, operation of the main brake would first fill the auxiliary system through the one-way valve, until the latter was filled, after which the main system would be operable in the normal manner.

The present invention may be employed with either a fluid power brake or a conventional fluid brake having a master cylinder. Further, either of these brake devices may be employed with either a conventional cylindrical drum type brake or a disc type brake.

A first embodiment of the auxiliary fluid system of the present invention may be employed either with a power brake or with a conventional master cylinder. In this embodiment both the one-way valve and the control valve are located directly in fluid lines connecting the auxiliary fluid cylinder to the source and to the reservoir, the one-way valve being located in a branch line from the cylinder to the source and the control valve being located in a branch line from the cylinder to the reservoir.

This first embodiment may employ any one of several types of control valves including, for example, a slide valve or a cam operated valve.

A second embodiment of the auxiliary system includes a modified master cylinder wherein the said valves regulating the flow of fluid to and from the auxiliary cylinder are located right in the master cylinder. The control valve is so situated in the master cylinder that upon failure of the main system and movement of the brake piston beyond its normal range of travel, the control valve would open to permit pressure fluid to flow from the auxiliary brake cylinder to the reservoir. In this arrangement the one-way valve between the source of pressurized fluid and the auxiliary fluid system would also be located in the master cylinder.

Either embodiment described above could be used with any conventional type of brake assembly, for example, a conventional cylindrical drum brake assembly and a disc brake assembly.

The present invention also includes various arrangements for mounting the auxiliary brake cylinder to operate the brake assembly.

The auxiliary brake cylinder may be mounted on the same mounting plate which contains the conventional brake shoes, the brake lining and the main brake cylinder. The auxiliary cylinder includes a piston connected to the brake shoe through suitable linkage means and continually forced by the resilient means such as a spring to a position to cause engagement of the brake. However, during normal operation of the vehicle this force is offset by the pressure fluid in the auxiliary cylinder urging the piston and the linkage means to a position which does not cause brake actuation and which, in fact, permits normal engagement and disengagement of the brake under the influence of the main brake cylinder.

In one embodiment the linkage means includes a plurality of links connected through lost motion connections to the brake shoes. When the said piston is moved by the spring, upon release of the pressurized fluid, the links move outwardly against the outer portion of the lost motion connection urging the brake linings into engagement with the drum. In another embodiment the ends of the brake shoes are engaged by a wedge member which is connected directly to the piston and which moves linearly with the piston upon release of the pressurized fluid to urge the brake shoes apart and into engagement with the drum. In this embodiment the auxiliary brake cylinder may be located on the back of the mounting plate and include a rod extending through the plates to hold the wedge. In still another embodiment the brake shoes may be actuated by a rotating cam member mounted between the brake shoes and actuated by a rod connected directly to the said piston and movable to rotate the cam upon movement of the said piston.

In another embodiment, designed especially for use in a disc type brake, that is, a brake having a disc shaped drum, the frictional members on each side of the drum may have both main cylinders and auxiliary cylinders located behind the frictional elements. With pressure in the auxiliary cylinders, only the main cylinders actuate the friction members. However, upon release of the fluid from the auxiliary cylinders the brake is engaged.

The present invention also includes means for moving the said piston manually to the inoperative position to disengage the brake in the event that an accidental leak occurs in the auxiliary fluid system.

Although the invention may employ either pneumatic or hydraulic fluid, in view of the incompressibility of liquid, the hydraulic system is preferred. It should be noted that the present invention includes an arrangement for draining the hydraulic fluid from the auxiliary system to a reservoir. Without this arrangement it would not be possible to employ a hydraulic fluid. In contrast thereto, in a pneumatic system it is only necessary to release the pressure fluid from the auxiliary system to the atmosphere.

Thus, it is an object of this invention to provide an improved auxiliary fluid brake system.

It is another object of this invention to provide an auxiliary brake system, for use in conjunction with a main fluid system, which auxiliary system can serve as a safety brake and/or as a parking brake.

It is still another object of this invention to provide a fluid operated safety brake operable to cause brake engagement upon failure of a main brake system.

It is still another object of this invention to provide a fluid operated safety brake operable to cause brake engagement upon failure of a main brake system.

It is still another object of this invention to provide a fluid actuated parking brake.

It is still another object of this invention to provide an auxiliary fluid system operable with either a power brake or a conventional master cylinder and either of the above adapted for use with either a cylindrical wheel drum brake assembly or a disc type brake assembly.

It is still another object of this invention to provide a master cylinder of a fluid braking system including as a part thereof a unique control valve arrangement for allowing operation of a safety brake in response to movement of the piston of the master cylinder upon failure of the main brake system.

It is still another object of this invention to provide a unique valve unit in a master cylinder having a main chamber and an auxiliary chamber and including a means for restoring pressure to the auxiliary chamber upon normal operation of the main brake system.

It is still another object of this invention to provide an auxiliary fluid system wherein the opening of a valve permits brake actuation and wherein pressurized fluid is supplied to the auxiliary system through initial normal operation of a main brake system.

Other objects and the attendant advantages of the present invention will become apparent from the detailed description to follow together with the accompanying drawings.

BRIEF DESCRIPTION OF THE DRAWINGS

There follows a detailed description of preferred embodiments of the present invention to be read together with the accompanying drawings. However, it is to be understood that the preferred embodiments are shown and described only for purposes of illustration and that the invention is capable of numerous variations and modifications without departing from the spirit and scope of the invention.

In the drawings:

FIGURE 5 illustrates in detail the master cylinder shown in FIGURE 4.

FIGURE 9 illustrates a wheel brake assembly including an embodiment of an auxiliary brake cylinder unit constructed according to the present invention.

FIGURES 10 and 11 illustrate the inside and top, respectively, of a brake assembly including another embodiment of an auxiliary brake cylinder unit constructed according to the present invention, FIGURE 11 being taken along line 11—11 of FIGURE 10.

FIGURES 12 and 13 illustrate the inside and back, respectively, of a brake assembly including another embodiment of an auxiliary brake cylinder unit constructed according to the present invention.

DESCRIPTION OF THE PREFERRED EMBODIMENTS

Figure 1:
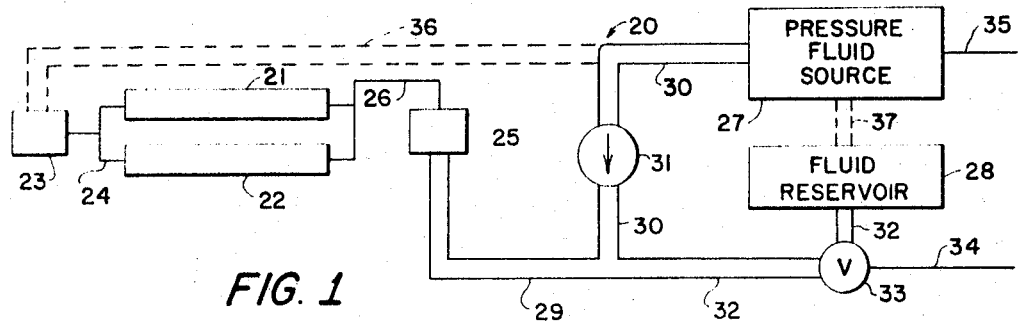
FIGURE 1 is a diagrammatic view illustrating the features of the brake system according to the present invention.

Terms such as "left," "right," "upwardly," or "downwardly," etc., are used throughout the following description for convenience to refer to the position of the elements as shown in the drawings. However, it should be understood that the elements of the invention can assume any position in practice. Also, for purposes of convenience, like numerals are employed to designate like elements throughout the drawings.

FIGURE 1 illustrates the principle of operation of the invention. There is shown first and second brake elements 21 and 22 movable between engaged and disengaged positions, the latter being shown in the drawing. By way of example, one of the brake elements may be a wheel drum rotatable with a wheel, and the other may be the friction lining of a brake shoe. The brake would include a main brake actuator 23 connected to the brake elements through a suitable linkage indicated diagrammatically as 24.

A main feature of the present invention is an auxiliary brake system 20 including a cylinder 25 linked to the brake elements through a suitable linkage 26. This auxiliary brake cylinder 25 is movable between at least two positions, a first position wherein the cylinder 25 remains inoperative and permits engagement and disengagement of the brake under the influence of actuator 23 completely independent of auxiliary brake cylinder 25, and a second position whereat the auxiliary brake cylinder 25 causes the two brake elements to engage.

In manner to be described in greater detail below, the auxiliary brake cylinder 25 is moved to the first position under the influence of pressurized fluid. A spring continuously opposes the force of this pressure fluid attempting to move the cylinder to the second position.

The hydraulic portion of the system includes a source 27 of pressurized fluid and a reservoir 28 for receiving released fluid. The fluid line 29 directly from the cylinder 25 is connected to the source 27 through branch line 30 and one-way valve 31. Line 29 is connected to the fluid reservoir 28 through branch line 32 including the release control valve 33.

Under normal operating conditions fluid under pressure is retained in the cylinder 25, in lines 29 and 30 and in the portion of line 32 on the side of valve 33 closest to line 29. Under this normal condition cylinder 25 permits continuous engagement and disengagement of the brake elements under the influence of the main brake actuator 23 through linkage 24.

If, for some reason, the main brake 23 becomes defective (or manually at will, if desired), a mechanical actuator 34 is operated to open valve 33 permitting the fluid in the auxiliary brake cylinder to be released to the fluid reservoir 28. Upon the release of this fluid linkage system 26 would automatically cause the brake elements 21 and 22 to engage each other.

It is contemplated that the mechanical actuator 34 will have two separate functions. First, it will be mounted in such a manner as to open valve 33 semi-automatically upon failure of the main brake 23. Secondly, it may be employed as a parking brake in addition to brake 23.

To restore pressure fluid to the auxiliary cylinder 25 after the completion of the braking operation, it is only necessary to close the valve 33 and then actuate member 35 to cause pressure fluid to flow from source 27 through line 30, one-way valve 31 to line 29 and auxiliary brake cylinder 25.

The brake system described above is substantially complete. However, additional fluid lines, shown in dotted lines in FIGURE 1, will normally be employed in systems to which the present invention will be applied. For example, the main brake 23 will normally be a fluid actuated brake receiving pressurized fluid from the same source 27 through a suitable fluid connection 36. Also, to complete the fluid circuit, the source 27 will normally receive fluid through line 37 from the reservoir 28. The numerals of FIGURE 1 will be employed below where applicable in all of the following figures. However subscripts *a*, *b*, *c* or *d* will be applied to designate specific constructions of the said elements as applied to specific embodiments.

Figure 2:
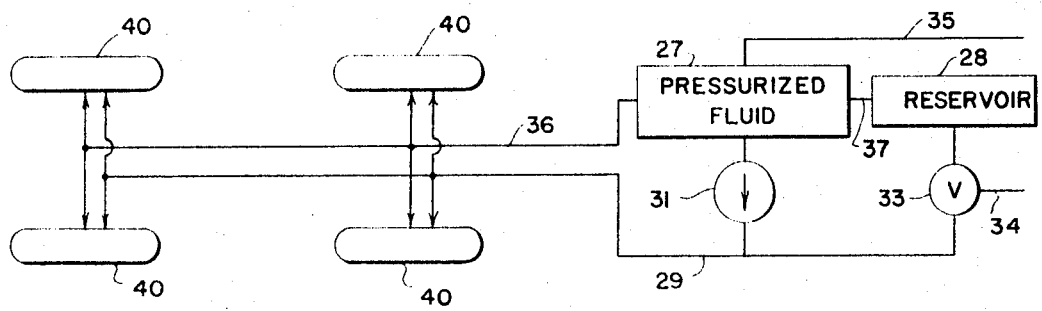
FIGURE 2 is a diagrammatic view illustrating the application of the invention to the wheels of an automobile.

FIGURE 2 illustrates the brake system of the present invention as applied to a vehicle. Lines 29 and 36 are shown directed to the four wheels of a vehicle through the two separate fluid lines 36 and 29. Of course, the fluid connections could lead to only two wheels instead of four wheels.

The brake system of the present invention can be employed with either a power brake or a conventional master cylinder. Moreover, the auxiliary brake cylinders can be designed for use with either the conventional circumferential brake assembly or with a disc brake assembly. These applications of the brake system will be described below.

Figure 3:
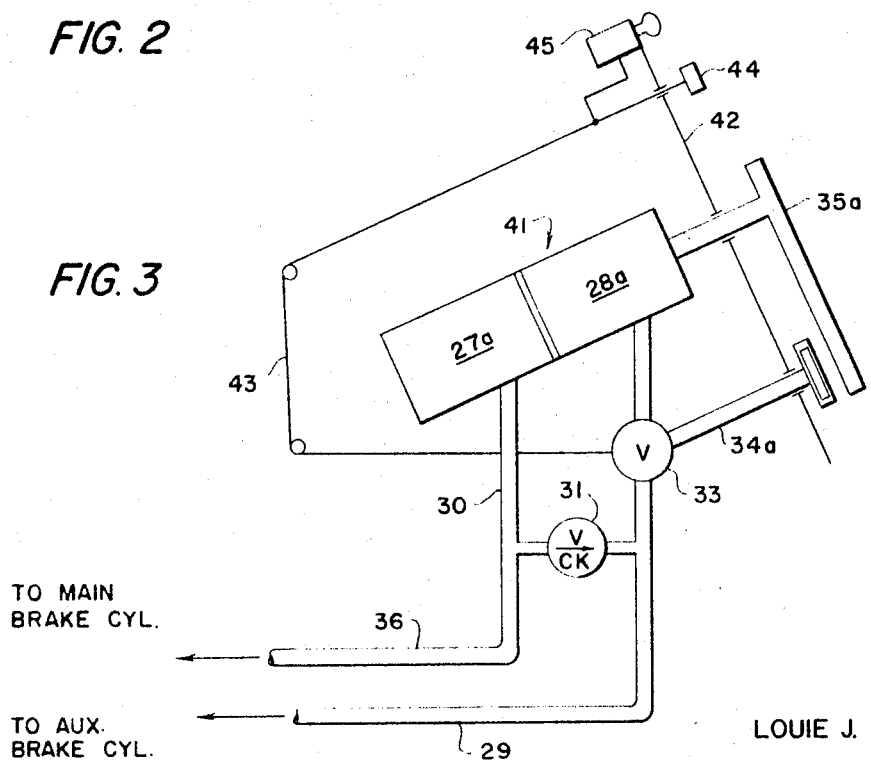
FIGURE 3 is a schematic view illustrating one embodiment of the control portion of the brake system.

FIGURE 3 illustrates the application of the invention for use in an automobile. The brake unit 41 may be either a power brake, which would include a hydraulic pump between reservoir 28a and pressurized fluid source 27a. Alternatively, brake unit 41 could be a conventional master cylinder in which case the reservoir portion 28a would be mounted above the cylinder which would constitute the pressure portion. Fluid would be fed to the pressure portion 27a upon retraction of the piston which would constitute actuating means 35a.

As illustrated in the drawings, 35a represents the conventional brake pedal. Means for actuating valve 33 includes a rod 34a, a portion of which extends through a fire wall 42 to a point below pedal 35a. The rod 34a would not be contacted by pedal 35a during normal braking movement of the latter. However, if the main braking system failed, then 35a would be jammed to the floor and would engage actuator 34a thereby opening valve 33 and permitting the release of fluid from the auxiliary cylinder thereby causing the brake to engage. Valve 33 could also be actuated by a linkage system 43 and a manual actuator 44. To reload auxiliary cylinder 25 one would close valve 33 and operate pedal 35a causing pressurized fluid to flow through valve 31 and line 29 to load cylinder 25.

Linkage 43 could also be connected to ignition switch 45 to open valve 33 and thereby release the pressure from auxiliary cylinder 25 whenever the ignition switch was moved to the "OFF" position.

Figure 4:
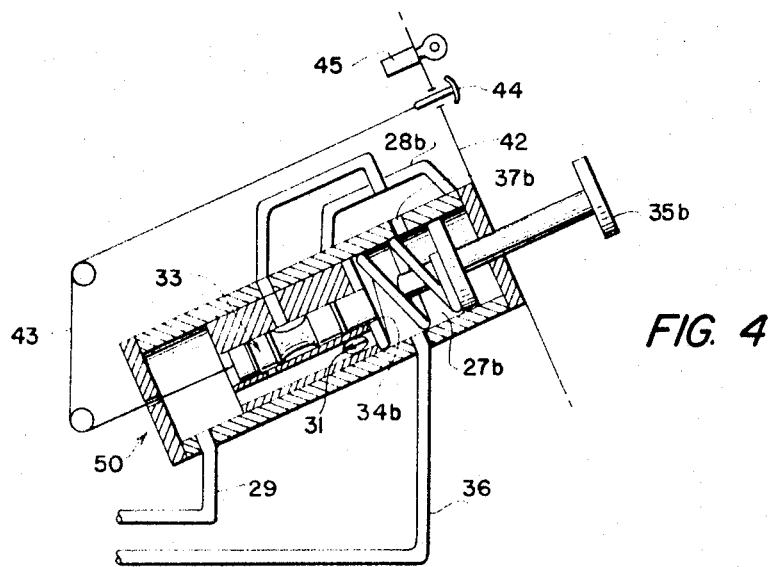
FIGURE 4 is a schematic view illustrating another embodiment of the control portion of the brake system, this embodiment being incorporated into a non-power brake master cylinder.

FIGURE 4 illustrates the brake system of the present invention in the form of a reconstructed modified master cylinder 50 including all of the valve elements located therein. In the arrangement of FIGURE 4, the valve 33 is in the form of a slide valve located within the master cylinder. The source 27a of pressurized fluid is fed from reservoir 28b through an opening 37b. Source 27b is connected to auxiliary brake cylinder line 29 through one-way valve 31. In this arrangement failure of the main brake system will cause the main brake actuator 35b to engage the slide valve, the righthand end thereof constituting the valve actuator 34b. A suitable linkage 43 for the parking brake is also provided.

Figure 6:
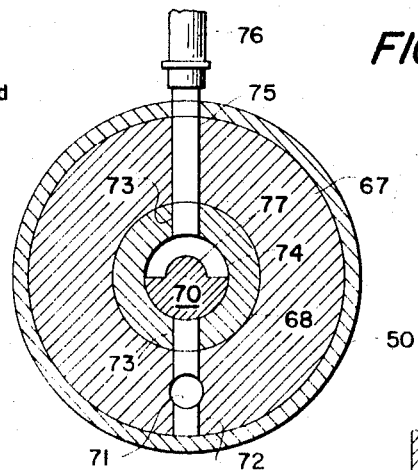
FIGURE 6 is a cross-section view taken along line 6—6 of FIGURE 5.

A typical construction of master cylinder 50 is shown in greater detail in FIGURES 5 and 6.

Master cylinder 50 includes reservoir 28b closed off by a cap 52 and open to the interior of the master cylinder through apertures 37b. Within the master cylinder 50 there is provided a conventional main piston 54 connected to a push rod 35b which is in turn connected to the brake pedal. The rod 35b may be connected to the body of piston 54 by any suitable means such as a screw and thread arrangement. At the other end of piston 54 there is provided a spike 60, the purpose of which will be described in greater detail below. A piston head 56 and a holding member 59 are connected to the left end of piston 54. The interior of the cylinder 50 to the left of piston 54 forms a pressure chamber 27b including a spring 58 for urging the piston 54 to the right.

Aperture 37b allows make-up fluid to flow from reservoir 28b to chamber 27b when the piston 54 is moved to its fully retracted position under the force of spring 58. The righthand aperture 37 allows the fluid to flow into the space behind piston head 56. Line 36 directs pressure fluid to the main brake 23 when the piston 54 is moved to the left.

At the left end of the master cylinder 50 there is provided the arrangement for pressurizing and releasing fluid from the auxiliary brake cylinders 25. A control unit 65 separates pressure chamber 27b from an auxiliary pressure chamber 66. This auxiliary pressure chamber is connected through fluid line 29 to one or more auxiliary brake cylinders 25.

The unit 65 includes an outer cylindrical plug member 67. Within outer plug 67 is mounted an inner cylindrical plug 68. A valve member 70 slides within plug 68, bounded by a plurality or O-rings 80. The control unit 65 includes a passageway from chamber 66 to reservoir 28b, this passageway being selectively opened or closed, depending upon the longitudinal position of sliding valve member 70.

The passageway includes a horizontally extending bore 71 in constant communication with vertically extending bore 72 and a lower portion of a vertically extending bore 73, the latter being formed in member 68. An upper portion of the bore 73 is offset longitudinally from the lower portion of bore 73 and is in constant communication with bore 75 in plug 67 and fluid line 76 to reservoir 28b.

The valve member 70 is shown in FIGURE 5 in its normal position closing the passageway between upper and lower bores 73. When it is desired to open the passageway, the member 70 is moved to the left so that reduced diameter portion 77 in valve member 70 completes the passageway between the two portions of bore 73. When the passageway is complete pressure fluid will flow from auxiliary cylinder 25 along line 29 to chamber 66 and through bores 71, 72, 73, 75, 77 and 76 to the reservoir 28b thereby releasing the pressure in auxiliary cylinder 25.

Also shown in FIGURE 5 are spring biassed holding members 81 for holding the sliding valve member 70 in either the open or the closed position. One holding member 81 engages groove 81a in valve member 70 while the other is restrained within its bore 82 by the restricted lower opening therein. Members 81 are urged downwardly by springs 83. The bores are closed off by screw threaded caps 84.

One-way valve 31 is constituted by a one-way check valve 85, biased by spring 87 to rest on seat 86, thereby allowing pressure fluid to flow from chamber 27b to chamber 66 whenever the pressure in chamber 27b exceeds that in chamber 66 by an amount sufficient to overcome the force of spring 87.

In the embodiment of the invention illustrated in FIGURES 5 and 6 two mechanisms are shown for urging the valve 70 to the left to open the passageway from the chamber 66 to reservoir 28b.

First, it will be noted that the spike 60 mounted on piston 54 is axially aligned with the sliding valve member 70. When the fluid pressure in the main system fails the piston 54 will move to the left until this spike 60 urges sliding member 70 to the left to place bores 73 in fluid communication.

Next, there is shown a mechanism 90 for manually actuating the slide member 70 at will. For this purpose there is shown a link 91 connected to the left end of the sliding member 70, this link being engageable by a catch member 92 which is free to move longitudinally within the chamber 66. Leftward movement of catch member 92 will pull the link 91 and thus the valve member 70 to open the passageway in the partition. Such leftward movement of catch member 92 may be provided by rotating a connecting link 93 counterclockwise about a pivot point 96 by pulling the manually actuable lever 95 to the right. The link 93 penetrates the wall of the master cylinder 50 through a suitable leakproof bushing 94. It will be noted that a space is provided within catch member 92 to the left of link 91. Because of this space the member 70 can be moved to the left by spike 60 without moving the catch member 92. Thus, the two actuating mechanisms 60 and 92 each operate sliding valve member 70 independent of the other.

Figure 8:
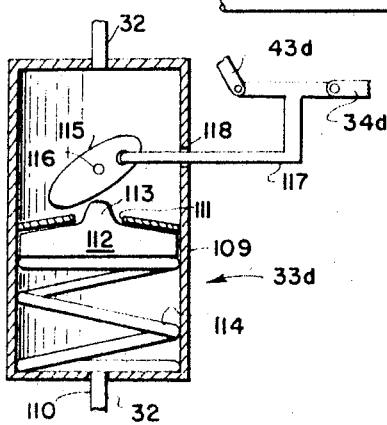
FIGURE 8 illustrates a cam operated valve adapted for use as a release control valve in the control portion of FIGURE 1.

When employing the fluid control system of FIGURE 3, with either a power brake or a conventional fluid brake, the release control valve 33 is separated from the brake device 41, connected thereto by suitable fluid lines. When the valve 33 is isolated from the braking device 41 in this manner, then the valve 33 may be constructed in a number of different ways. Two such constructions are shown in FIGURES 7 and 8.

Figure 7:
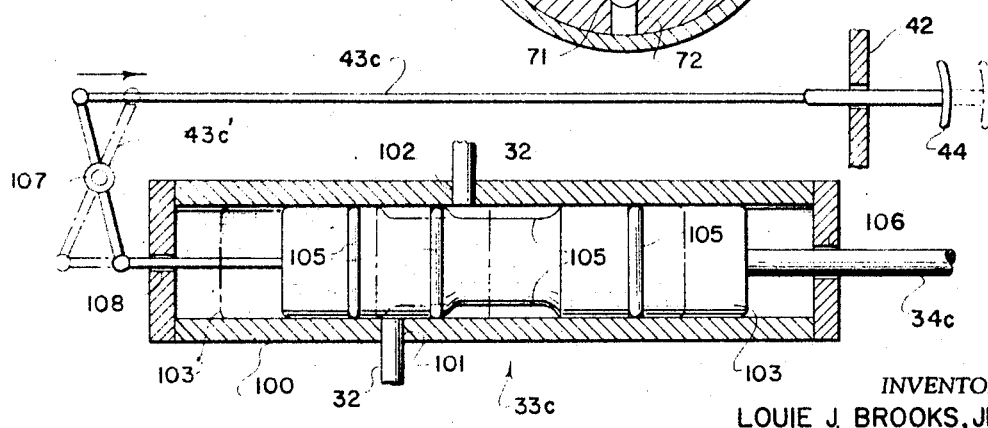
FIGURE 7 illustrates a slide valve adapted for use as a release control valve in the control portion of FIGURE 1.

FIGURE 7 illustrates a slide valve 33c comprising a casing 100 having an inlet opening 101 and an outlet opening 102 forming a part of fluid line 32. A slide member 103 is slidably mounted within the casing 100 and includes a reduced thickness part 104 and a plurality of O-rings 105. At one end the member 103 is connected to an actuating member 34c through an opening 106. At the other end the member 103 is connected through a suitable opening 108 to a linkage system 43 which extends through the fire wall 42 to a handle 44 thereby permitting operation of the sliding valve manually to permit operation of the brake system as a parking brake.

It is immediately apparent that the slide valve 33c is far more simplified than the arrangement shown in FIGURES 5 and 6. First, the one-way valve permitting flow of pressurized fluid to the auxiliary system is provided as a separate valve and is not incorporated as a part of the valve 33c. Secondly, in place of the holding elements 81, the valve 33c is held in the chosen position by suitable friction connections in the linkage system 43c. That is, in this system the actuator 34c and the linkage system 43c are not operated independently of the other. Rather, as either one is actuated the other will follow. Thus, the lost motion connection of FIGURE 5 is not necessary.

In the position shown in FIGURE 7 the middle O-ring 105 prevents the flow of fluid between inlet 101 and outlet 102. However, by actuating either the element 34c (as a safety brake) or the element 44 (as a parking brake), the sliding member 103 is moved to the left to assume the dotted line position 103′ permitting flow of fluid between the inlet 101 and outlet 102 around reduced thickness portion 104. Meanwhile, the linkage system 43 rotates about axis 107 to the dotted line position 43c′.

FIGURE 8 illustrates another release control valve 33d. This valve arrangement includes a casing 109 located in fluid line 32 and having an inlet 110. A valve seat opening 111 is normally closed by the tapered portion 113 of a valve member 112 which is normally urged into the opening 111 by spring 114. A cam member 115 is rotatable counterclockwise about an axis 116 to urge the member 112 away from opening 111 thereby permitting the flow of fluid therethrough. Cam 115 is connected to a rigid link 117 which extends through the casing 109 through opening 118. Leftward movement of the rigid link 117 thereby causes the valve 33d to open. Such leftward motion of link 117 may be provided by a safety brake actuator 34d or a parking brake linkage system 43d.

All of the fluid systems described above are completed by an auxiliary brake cylinder unit and the present invention includes various arrangements for mounting the auxiliary braking cylinder units on either a conventional circumferential type brake or to a disc type brake. FIGURES 9–16 illustrate the application of the auxiliary brake cylinder to these various types of brake assemblies.

FIGURE 9 illustrates one arrangement for connecting an auxiliary brake cylinder unit to a conventional circumferential type brake assembly.

FIGURE 9 illustrates a conventional brake unit 120 secured to a mounting plate 122 for engagement with a wheel drum 121. The brake includes a right brake shoe 123R and a left brake shoe 123L, each shoe having a brake lining 124 mounted thereon for frictional engagement with wheel drum 121. The brake shoes are mounted in the usual manner spaced apart by an adjustable strut 125 and operable to engage the wheel drum by the action of fluid supplied along line 36 to hydraulic brake cylinder 126 to move rods 127. The brake shoes are held in the disengaged position by spring members 129.

In accordance with the present invention, there is added to the basic conventional brake structure an auxiliary brake cylinder 130 having mounted therein a plunger 131 having a sealing piston head 132. To the right of piston head 132 there is provided a pressure chamber 133 to which fluid under pressure is supplied along line 29. To the left of piston head 132 there is provided within cylinder 130 a compression spring 134 continuously urging the plunger 131 to the right. The spring is strong enough to actually move the plunger 131 to the right only when the pressure fluid is not present in the chamber 133.

A linkage system 135 connects the plunger 131 to the brake shoes 123L and 123R to cause actuation of the brake. Plunger 131 is pivotally connected to a rod 136 at pivot connection 138. The rod 136 is pivotally connected to the mounting plate 122 at 137. This main link 136 is connected at pivot point 140 to a right connecting link 139 which engages brake shoe 123R at a pivot connection 141 passing through elongated slot 142. Similarly, the main link 136 is pivotally connected to a left connecting link 143 at pivot point 144 and this left link is connected to brake shoe 123L at pivot connection 145 passing through an elongated slot 146.

FIGURE 9 illustrates the position of the plunger 131 and the linkage system 135 during normal operation of the vehicle. During such normal operation, the auxiliary brake cylinder and the linkage system do not cause engagement of the brake. This is accomplished by supplying pressure fluid to chamber 133 to offset the force of spring 134, urging the plunger 131 to the left thereby pivoting connecting links 139 and 143 inwardly of the brake assembly. Also, the brake should be capable of normal engagement and disengagement under the action of brake cylinder 126 while the auxiliary brake arrangement is held in the nonactuated position. This is accomplished by connecting the links 139 and 143 to the brake shoes 123R and 123L through elongated lost motion slots 142 and 146, respectively. It can be seen that brake cylinder 126 can urge the brake shoes against the wheel drum without affecting or being hindered by the rods 139 and 143. As the brake shoes are actuated by cylinder 126 and push rods 127 the brake shoes will merely move outwardly as slots 142 and 146 slide past their respective pivot connections 141 and 145. However, to actuate the brake through the action of the auxiliary braking system by moving plunger 131 to the left, the pivot connections 141 and 145 will engage the outer end of elongated slots 142 and 146, respectively, to urge the brake shoes outwardly into engagement with the wheel drum 121 independently of hydraulic brake cylinder 126.

From the above it is apparent that the auxiliary brake system, which is intended to serve either as a parking brake or as a safety brake, can be actuated merely by releasing the pressure fluid from chamber 133.

If a leak inadvertently occurs in the auxiliary brake cylinder fluid system, the spring 134 would cause engagement of the brake. Consequently, the present invention includes a mechanical means for compressing the spring 134 to prevent undesired actuation of the brake. For this purpose the lefthand end of plunger 131 is screw threaded and is provided with a nut 148 which is accessible through an opening 149 in the mounting plate 122. The lefthand end of the cylinder 130 would provide an abutment limiting rightward movement of the nut 148. Therefore, simply by turning the nut 148 the rod 141 could be urged to the left thereby disengaging the brake, until the fluid system could be repaired.

FIGURES 10 and 11 illustrate another embodiment of a conventional circumferential drum brake assembly employing a modified auxiliary brake cylinder unit. In the modified brake assembly 152 are included right and left brake shoes 153R and 153L. The main cylinder 126 and the rods relative to their positions in FIGURE 9 thereby permitting the upper ends of the brake shoes 153R and 153L to come much closer together. A wedge 154 is placed in the space between the two brake shoes so that rearward movement of the wedge causes outward movement of the brake shoes thereby causing engagment of the brake. This wedge 154 is connected directly to rod 131 of auxiliary cylinder 130 through a slot 155 in the mounting plate 122. Roller bearings 156 are mounted in the ends of shoes 153 to rotate about axes 157. The rollers engage a flat part 159 of wedge 154 in the brake "OFF" position. When the rod 131 moves rearwardly, however, raised surfaces 158 engage the rollers 156 to urge the shoes 156 outwardly. It is apparent that this system is vastly simplified as compared with that of FIGURE 9 in that almost all linkage between the auxiliary brake cylinder 130 and the brake shoes has been eliminated. Moreover, with the arrangement of FIGURES 10 and 11, it is not necessary to provide space on the interior of the wheel assembly to mount the auxiliary cylinder and its linkage system. Further, while the two brake shoes of FIGURES 10 and 11 are shown as being symmetrically positioned about a vertical diameter through the brake assembly, the shoes may actually be symmetrical about any other diameter. This means that the auxiliary brake cylinder 130 may be located at any position behind the plate 122 taking into account the fact that other structural elements of the vehicle behind plate 122 may prevent locating the auxiliary brake cylinder in the position as shown in FIGURES 10 and 11.

FIGURES 12 and 13 illustrate a conventional circumferential brake assembly 152a employing another linkage system between cylinder 130 and the brake shoes.

The embodiment of FIGURES 12 and 13 is very similar to FIGURES 10 and 11, the main difference being that the cylinder 130 is mounted flat against the back of plate 122, the wedge 154 is replaced by a rotatable cam 160 mounted on an axis pin 161 for rotation thereabout, the pin 161 extending through the plate 122 for engagement with a rod 162 which is in turn engaged at pivot connection 163 with the upper end of plunger 131.

In certain situations the arrangement of FIGURES 12 and 13 may be preferable to that of FIGURES 10 and 11. For example, because of intermediate rod 162, the arrangement of 152a may provide greater flexibility in mounting the auxiliary brake cylinder 130 at a convenient location on the back of plate 132.

Figure 14:
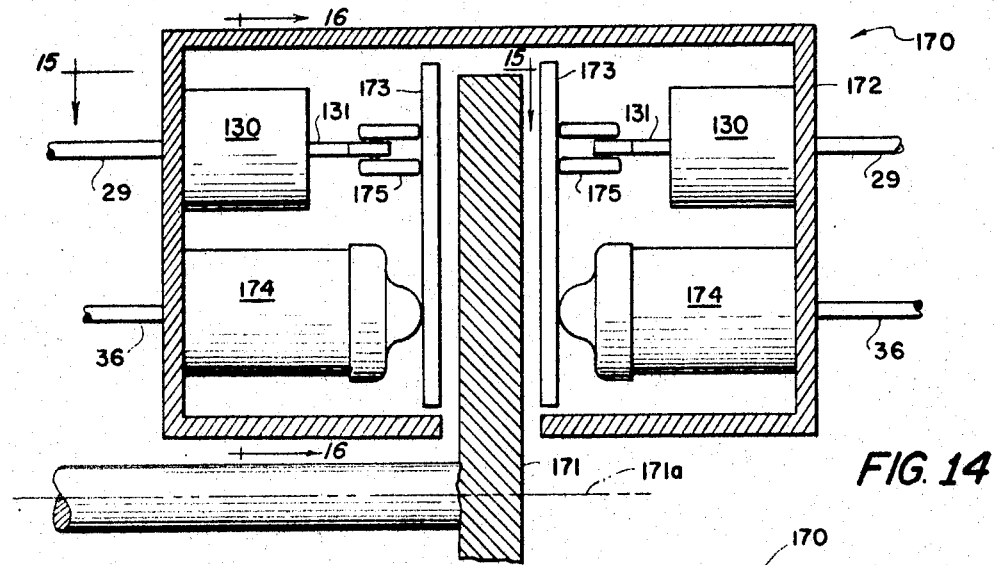
FIGURE 14 illustrates a disc type wheel brake assembly including another embodiment of an auxiliary brake cylinder unit.
Figure 15:
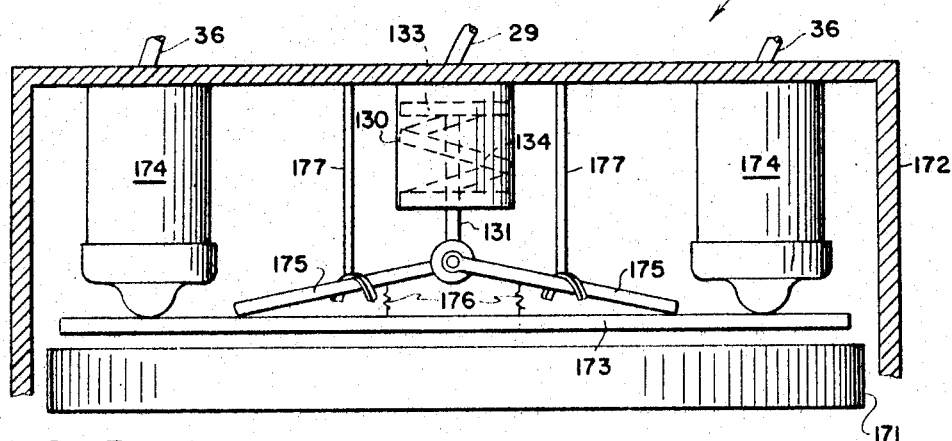
FIGURE 15 is a plan view taken along line 15—15 of FIGURE 14.
Figure 16:
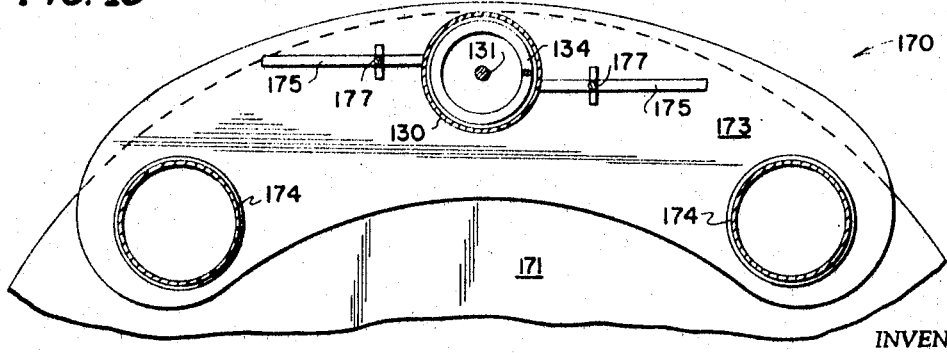
FIGURE 16 is an elevation view taken along line 16—16 of FIGURE 14.

FIGURES 14–16 illustrate the application of the present invention to a disc type brake. It will be apparent that in the embodiment of FIGURES 14–16, as in the arrangement of FIGURES 9–13, the auxiliary brake cylinders are movable at least between two positions, in the first of which they permit normal engagement and disengagement of the frictional brake elements under the influence of the main brake cylinders independently of the auxiliary brake cylinders, and in the second of which the auxiliary brake cylinder positively causes the engagement of the brake to engage.

Referring to FIGURE 14 there is shown a disc brake assembly 170 including a disc wheel drum 171 rotatable with the wheel about axis 171a. The assembly includes a disc brake housing 172 and a pair of firictional plates 173 which are engageable with drum 171 to prevent rotation of the latter.

Within the housing 172 there are provided main brake cylinders 174 supplied with fluid from main fluid supply line 36. Also located within housing 172 on each side of the drum 171 is an auxiliary brake cylinder 130 constructed in exactly the same manner as the auxiliary brake cylinders 130 described in FIGURES 9–13. The cylinder 130, as well as the cylinders 134, are mounted on the back of housing 172 away from the plate 173.

Referring now to FIGURE 15, the auxiliary brake cylinder and the rod 131 are shown in the loaded position, that is, with spring 134 compressed by pressurized fluid in chamber 133. A pair of rods 175 are connected to the end of rod 131 and pivotally movable relative thereto. These rods are held into engagement with plate 173 by springs 176 and movement away from plate 173 is prevented by a pair of braces 177 connected to the back of housing 172.

In the drawings the brake is shown in the disengaged position. Referring to FIGURE 15 it is evident that with the arrangement of elements 131, 175, 176, 177, as shown in the drawing, the main cylinders 174 may cause engagement and disengagement of the brake independently of the auxiliary brake cylinder. However, when fluid is released from pressure chamber 133 the rod 131 moves away from the brake plate 173 thereby causing pivotal movement of rods 175 about their engagement with struts 177 and towards the plate 173 thereby causing the latter to engage the wheel drum 171.

It is believed that the operation of the invention will be apparent from the above detailed description of the preferred embodiments. However, by way of summary a further description of the operation of the invention will be presented.

As shown in all of the drawings, the various embodiments of the present invention are in position for normal operation of the brake assembly through the influence of the main brake cylinders 126 or 174 which are supplied with pressurized fluid along fluid line 36. High pressure is present in chamber 133 of the cylinder 130, in line 29, in line 30 and in the portion of line 32 on the side of closed valve 33 towards line 29. This high pressure fluid, preferably hydraulic liquid, is at a sufficient pressure to urge the piston 132 to compress the spring 134 so that the linkage system between the rod 131 and the brake shoes permits operation of the brake shoes independently of the said linkage system.

Under normal operation, the brake pedal 35 does not move far enough to cause the member 34 to open the valve 33. That is, referring to FIGURES 3 and 5, in FIGURE 3, the pedal 35a does not contact rod 34a during normal operation, and in FIGURE 5 the rod 35a (the spike 60a) does not engage the element 34b (the righthand end of slot valve 70). As long as the pressure in line 29 is equal to or greater than the pressure in chamber 27, then one-way valve 31 remains closed.

Assume now that a leak develops in the main fluid brake system thereby reducing the pressure in chamber 27, line 36 or any brake cylinder 126 or 174. If this occurs, then the main brake system will fail.

With the present invention, however, reduced pressure in the chamber 27 will allow the rod 35 to continue to move to the left beyond its normal range to engage the rod 34 and thereby open the valve 33. In the embodiment of FIGURES 4–6 the spike 60 will engage the righthand end of sliding valve 70 and urge the same to the left until the holding member 81 engages the groove 81a and the reduced diameter portion 77 places the two bores 73 into fluid communication with each other. Once the tube bores 73 are in fluid communication with each other fluid will pass from the chamber 66 through passages 71, 72, 73, 73, 77, 75 and 76 to reservoir 28. The slide valve of FIGURE 7 will operate in substantially the same manner as the slide valve 70 of FIGURE 5. In the valve 33d of FIGURE 8 the linkage 117 will cause the cam member 115 to cause the valve member 112 to unseat from opening 111 thereby permitting the flow of fluid therethrough. In all the brake assembly embodiments shown in FIGURES 9–16 opening of the valve 33 will permit fluid to flow from the chamber 133 through line 29 to the reservoir 28 thereby permitting movement of rod 31 under the influence of spring 134 in such a manner as to cause engagement of the brake linings with the wheel drum.

In the brake assembly of FIGURE 9 rightward movement of rod 131 will move the main link 136 counterclockwise about its axis 140 thereby causing links 139 and 143 to the right and left, respectively, to cause engagement of the brake shoes 123R and 123L, respectively, with the wheel drum 121.

In the embodiments of FIGURES 10 and 11 the linkage system between rod 131 and the brake shoes is vastly simplified. In FIGURE 10 the rod 131 is connected directly to a wedge 154 which moves with the rod 131 to cause the two brake shoes 153R and 153L to engage the brake drum.

Thus, it may be seen that the present invention capitalizes upon a natural human reaction to brake failure, namely flooring of the brake pedal, and nothing else, to operate the safety brake. The brakes will remain engaged until released by closing the valve 33 and actuating member 35 to cause more pressure fluid to flow from source 27 through the valve 31 to line 29 in chamber 133 to compress spring 134. Alternatively, of course, the spring 134 could be compressed simply by turning the nut 148 on the threaded portion 147 of the rod 131.

In all embodiments, once the valve 33 is closed, the main braking system is operated in the normal manner. However, because of one-way valve 31, the first movement of the member 35 will not cause engagement of the brake through the main cylinders 126 and 174. Rather, the first movement of the brake will cause pressure fluid to flow through the valve 131 to load the auxiliary system with fluid under pressure. Only after this has been accomplished will actuation of the member 35 cause operation of the main brake system. This is true for either a power brake or a conventional master cylinder fluid type brake.

For example, in the system illustrated in FIGURE 3, first movement of the member 35 will cause fluid to flow through valve 31 to fill the auxiliary brake system 29 and 133 before it brings about normal operation of the main brake. In FIGURES 4–6 the first movement of piston 54 will unseat valve 85 thereby permitting fluid to flow into chamber 66, line 29 and chamber 133 until the auxiliary system is filled with fluid at a pressure approximately equal to the pressure in the fluid chamber 27b.

After the auxiliary braking system of the present invention is used as a parking brake restoration of pressure to the auxiliary braking system is brought about in exactly the same manner as when valve 33 is opened for use as an emergency brake.

The use of an auxiliary brake of the present invention as a parking brake would have many advantages. For example, in the northern climate cold weather often causes the parking brake to freeze in the "ON" condition after a cold night. This occurs because water, forming on the cables and linkages of the conventional parking brake system, freezes overnight and thereby prevents disengagement of the parking brake the next morning. However, the present invention includes only fluid lines between the main braking device and the wheels, the only linkage being linkage 43 which runs from the braking device into the interior of the automobile.

Although the invention has been described above in considerable detail with respect to preferred embodiments thereof, it should be understood that these preferred embodiments are shown and described only for purposes of illustration, and that the invention is capable of numerous variations and modifications apparent to those skilled in the art without departing from the spirit and scope of the invention.

What is claimed is:

1. A brake system including at least two brake elements mounted on a frame and movable away from each other to permit relative movement therebetween and movable into engagement with each other to prevent relative movement therebetween, a source of pressurized fluid, a reservoir for receiving fluid at a pressure lower than that of said pressurized fluid, an auxiliary brake cylinder unit mounted on said frame, linkage means operatively connecting said auxiliary brake cylinder unit to one of said brake elements and movable at least between a first position permitting the said two brake elements to move away from each other and a second position whereat the linkage means causes the said two brake elements to engage each other, a continuous force means continuously acting upon the said auxiliary brake cylinder unit for urging the linkage means to move to said second position, means for supplying pressurized fluid from said source to said auxiliary brake cylinder unit for urging the linkage means to move to said first position, means for supplying pressurized fluid from said source to said auxiliary brake cylinder unit to apply a sufficient force to offset the continuous force means and thus urge the said linkage means to said first position, means for normally retaining said pressurized fluid in said auxiliary braking cylinder unit thereby normally keeping the linkage means in the said first position, and a release means for releasing the said pressurized fluid from said auxiliary brake cylinder unit and directing said fluid to said reservoir, thereby permitting said continuous force means to move the linkage means to the said second position, the system further including a main brake cylinder for operating said brake elements independently of the auxiliary brake cylinder, a main high pressure fluid passage for supplying pressurized fluid from said source to said main brake cylinder, and said means for supplying pressure fluid to the auxiliary brake cylinder including an auxiliary high pressure fluid passage between the source and the auxiliary brake cylinder, said auxiliary high pressure passage having a one-way valve therein permitting fluid to flow only in the direction towards the auxiliary brake cylinder, the said release means including a release passage between said auxiliary brake cylinder and said reservoir, a release control valve in the release passage for controlling the flow of fluid therethrough, and including a main actuator for acting upon the source to cause fluid to flow from the source towards the main brake cylinder, said one-way valve being arranged to permit fluid to flow to said auxiliary brake cylinder from said source until the auxiliary brake cylinder and the auxiliary high pressure fluid passage reach a predetermined pressure, above which pressure the one-way valve prevents return of fluid from the auxiliary brake cylinder to the source and wherein further actuation of the same said main actuator causes fluid to flow only to the main brake cylinder to operate the brakes.

2. A brake system according to claim 1 including means for supplying fluid from said reservoir to said source.

3. A brake system according to claim 2 wherein said fluid is liquid and wherein the last said means is a power actuated hydraulic pump.

4. A brake system according to claim 1 wherein said main actuator is operable within a predetermined range of movement for normal operation of the main brake cylinder, and including a first control valve actuator for opening the said release passage, said first actuator positioned to be actuated by said main actuator to open the control valve when the main actuator moves a preselected distance beyond the said predetermined range.

5. A brake system according to claim 4 including a second control valve actuator connected to said control valve and positioned to be operated at will to either open or close the control valve.

6. A brake system according to claim 5 wherein both said first and second control valve actuators move together, and wherein the second control valve actuator is held by its supporting structure sufficiently tight so that it will hold the control valve in the selected position until a force is exerted on one of the control valve actuators to move the valve.

7. A brake system according to claim 6 wherein said system is mounted on an automobile having an ignition switch, and including a mechanical connection between said ignition switch and said second control valve actuator for moving the second control valve actuator to open the release passage when the ignition switch is moved from the "ON" position to the "OFF" position.

8. A brake system according to claim 5 wherein said main high pressure fluid passage comprises a fluid line external to and running between the source of high pressure fluid and the auxiliary brake cylinder and having the one-way valve positioned therein, and said release passage constitutes fluid line external to and running between the auxiliary brake cylinder and the reservoir and having the release control valve located therein.

9. A brake system as claimed in claim 8 wherein said release control valve comprises a slide valve including a valve casing having an inlet and an outlet, and a slide member in the casing and movable to a first position to close the inlet and outlet and to a second position to place the inlet and outlet into fluid communication with each other, and wherein the first and second control valve actuators are connected to said slide member.

10. A brake system as claimed in claim 8 wherein said release control valve comprises a valve casing, said casing having an inlet and an outlet, a valve member in said casing for closing the passage between the inlet and the outlet, a cam member rotatable in said casing about an axis to selectively open and close the valve, and said first and second control valve actuators both being connected to said cam for moving said cam to control the opening of the valve.

11. A brake system according to claim 1 wherein said brake elements include a stationary friction surface and a rotatable drum surface, the said friction surface being movable against the rotatable drum surface to cause brake engagement, and wherein the main brake cylinder is mounted on the said support structure for urging the friction surface against the drum surface, and the said auxiliary brake cylinder is also mounted on the support structure, and including a linkage means connecting the auxiliary brake structure to the said friction surface.

12. A brake system according to claim 11 wherein the said auxiliary brake cylinder includes a piston, a link means connecting the piston to said friction surface to cause engagement or disengagement of the brake elements independently of said main brake cylinder, and said continuous force means including a resilient member for continuously urging said piston to the brake disengaged position.

13. A brake system according to claim 12 wherein the connection between the link means and the friction surface is a lost motion connection which allows movement of the friction surface under the influence of the main brake cylinder independently of the operation of the auxiliary brake cylinder.

14. A brake system according to claim 12 wherein the said drum surface is a cylindrical drum and wherein said friction surfaces comprise a pair of brake shoes mounted on said support structure, and including a wedge member mounted on said support structure for movement between the brake shoes such that linear movement of the wedge causes the friction surfaces of the brake shoes to engage the said drum surface, and wherein the said wedge is connected to said auxiliary brake cylinder pistons so that upon release of pressure from the auxiliary brake cylinder the wedge will move to urge the friction surfaces into engagement with the drum surface.

15. A brake system according to claim 12 wherein said drum surface comprises a cylindrical drum and said friction surface comprises a pair of brake shoes mounted on said support structure, and wherein the said link means includes a rotatable cam mounted on said support structure for rotatable movement to urge the brake shoes into engagement with the cylindrical drum and including a link between said rotatable cam and said auxiliary brake cylinder piston so that when the pressure fluid is released from the auxiliary brake cylinder the cam is rotated to urge the friction surfaces into engagement with the cylindrical drum.

16. A brake system according to claim 15 wherein said friction surfaces are flat and wherein said drum surface comprises a disc shaped rotatable drum, and wherein said link means comprises rod elements connected to said auxiliary brake cylinder piston for permitting normal movement of the friction surfaces against the disc shaped drum under the influence of the main brake cylinder and for urging the friction surface into engagement with the disc shaped drum upon movement of the auxiliary brake cylinder piston when the pressure is released from the auxiliary brake cylinder.

17. A brake system according to claim 16 wherein said friction surface is generally elongated and includes a pair of main brake cylinders positioned at each end thereof and the auxiliary brake cylinder positioned centrally thereof.

18. In a fluid brake system having a master cylinder, at least one brake operated by a main brake cylinder, a fluid connection between the master cylinder and the main brake cylinder for leading fluid under pressure to the brake cylinder to operate the brake, and a main actuating means for causing pressure fluid to flow from the master cylinder through said connection to said brake cylinder, the improvement comprising: an auxiliary brake cylinder associated with said brake and operable independently of said main brake cylinder, first means for continuously urging said auxiliary brake cylinder to a position to cause actuation of the brake, a pressure means for introducing pressure fluid to said auxiliary brake cylinder to offset said first means to hold the brake in its disengaged position, and a release means for releasing the pressure fluid in the auxiliary brake cylinder to allow said first means to cause actuation of the brake, said main actuating means being operable within a predetermined range of movement for operation of the main brake cylinders, and said release means including means which are operable upon movement of said main actuating means a preselected distance beyond the predetermined range, for releasing the pressure fluid from the auxiliary brake cylinder, the said master cylinder including a main chamber in fluid communication with said main brake cylinder, said main actuating means being a main piston slidably mounted in said main chamber, and said master cylinder further including an auxiliary chamber in constant fluid communication with said auxiliary brake cylinder and separated from said main chamber by a partition.

19. The system of claim 18 wherein said auxiliary brake cylinder includes a piston, link means connecting said piston to said brake to cause engagement or disengagement thereof independently of said main brake cylinder, said first means includes a resilient member for continuously urging said piston to the brake disengaged position.

20. The system of claim 19 including a spacing device for selectively holding the said linkage means in the brake disengaged position independently of said pressure fluid in the auxiliary brake system.

21. The system of claim 19 wherein the connection between the link means and the brake is a lost motion connection which allows movement of the main brake cylinder independently of the operation of the auxiliary brake cylinder.

22. The system of claim 18 wherein said pressure fluid is liquid and including a liquid reservoir for storage of fluid at low pressure, said partition including a selectively openable passageway from said auxiliary chamber to said reservoir, and a valve member movable in said partition at least between a first position to close said passageway and a second position to open said passageway.

23. The system of claim 22 including a one-way pressure sensitive valve for allowing fluid to flow from said main chamber to said auxiliary chamber when the pressure of the fluid in the main chamber exceeds that in the auxiliary chamber.

24. The system of claim 22 wherein said valve member is longitudinally slidable in said partition between said first and second positions, and wherein said main piston includes an actuating pin mounted thereon to move said valve member from said first position to said second position when the main piston has moved towards the partition a preselected distance past its normal predetermined range of movement.

25. The system of claim 24 including a manually actuated means operable independent of said main actuating piston for moving the valve member from its said first position to its said second position.

26. The system of claim 25 wherein said manually actuated means includes a link connected to said valve member and extending into said auxiliary chamber, and a catch member engageable with said link through a lost motion connection whereby movement of the valve member and link under the influence of the actuating pin does not cause movement of said catch member, and a link system connected to said catch member and operable to move the valve member from the first position to the second position independently of said actuating pin.

27. The system of claim 18, wherein said pressure fluid is hydraulic liquid, and including a reservoir for low pressure storage of said liquid, and including a selectively operable mechanism for selectively releasing the fluid in the auxiliary brake cylinder.

28. A fluid brake system including a master cylinder, a plurality of main brake cylinders, and means for delivering brake fluid from the master cylinder to the main brake cylinders, said master cylinder including a main chamber having a piston mounted therein and being in fluid communication with the plurality of main brake cylinders and an auxiliary chamber separated from the main chamber and in fluid communication with a plurality of auxiliary brake cylinders, said auxiliary cylinders and said auxiliary chambers normally under pressure and allowing engagement of the brake independent of the main brake cylinder when the pressure in the auxiliary brake cylinder and the auxiliary chamber is released, and including an actuating means in said master cylinder positioned to be engaged by the said piston beyond its normal operating range of movement to release the pressure in the auxiliary chamber and the auxiliary brake cylinder to engage the brake.

29. A master cylinder as claimed in claim 28 including a partition separating said chambers, a selectively openable passageway in said partition to allow pressure fluid to be released from said auxiliary cylinder, and a valve member mounted in said partition for movement between a first position to open the passageway and a second position to close the passageway, and wherein said actuating means includes a pin on said piston operable to move the valve member from said first position to said second position when the piston moves beyond its normal operating range of movement.

30. A master cylinder as claimed in claim 29 including a one-way pressure sensitive valve for allowing fluid to flow from said main chamber to said auxiliary chamber when the pressure of the fluid in the main chamber exceeds that of the auxiliary chamber.

31. A brake system including at least two brake elements mounted on a frame and movable away from each other to permit relative movement therebetween and movable into engagement with each other to prevent relative movement therebetween, a source of pressurized fluid, a reservoir for receiving fluid at a pressure lower than that of said pressurized fluid, an auxiliary brake cylinder unit mounted on said frame, linkage means operatively connecting said auxiliary brake cylinder unit to one of said brake elements and movable at least between a first position permitting the said two brake elements to move away from each other, and a second position whereat the linkage means causes the said two brake elements to engage each other, a continuous force means continuously acting upon the said auxiliary brake cylinder unit for urging the linkage means to move to said second position, means for supplying pressurized fluid from said source to said auxiliary brake cylinder unit for urging the linkage means to move to said first position, means for supplying pressurized fluid from said source to said auxiliary brake cylinder unit to apply a sufficient force to offset the continuous force means and thus urge the said linkage means to said first position, means for normally retaining said pressurized fluid in said auxiliary braking cylinder unit thereby normally keeping the linkage means in the said first position, and a release means for releasing the said pressurized fluid from said auxiliary brake cylinder unit and directing said fluid to said reservoir, thereby permitting said continuous force means to move the linkage means to the said second position, wherein the said brake system is a closed circuit hydraulic system including a main brake cylinder in addition to said pressure source and said auxiliary brake cylinder, and wherein said reservoir is in fluid communication with said pressure source to supply hydraulic liquid thereto to replenish the liquid therein, a main high pressure liquid passage from said pressure source to said main brake cylinders to supply hydraulic liquid thereto to operate the brakes independently of said auxiliary brake cylinder, and said means for supplying pressure to said auxiliary brake cylinder including auxiliary high pressure passage from said source to said auxiliary brake cylinder, a one-way valve in the auxiliary high pressure passage permitting liquid to flow only in the direction towards the auxiliary brake cylinder, and wherein said release means includes a release passage from said auxiliary brake cylinder to said reservoir, a release control valve being located in said release passage and having at least a first position closing off the said release passage and a second position opening the release passage and permitting liquid to flow from said auxiliary brake cylinder to said reservoir.

References Cited

UNITED STATES PATENTS

| | | | |
|---|---|---|---|
| 2,270,431 | 1/1942 | Freeman | 188—170 |
| 2,304,560 | 12/1942 | Freeman | 188—170 X |
| 2,527,126 | 10/1950 | Goepfrich et al. | 188—78 |
| 3,093,213 | 6/1963 | Limoges et al. | 303—9 X |
| 3,114,580 | 12/1963 | MacDuff | 303—9 X |
| 3,276,551 | 10/1966 | Buletti et al. | 188—170 X |
| 2,069,578 | 2/1937 | Eaton. | |
| 2,665,777 | 1/1954 | Joanis | 60—52 X |
| 3,194,353 | 7/1965 | Rick | 188—170 X |
| 3,272,566 | 9/1966 | Clack | 303—13 |

MILTON BUCHLER, Primary Examiner

JOHN J. McLAUGHLIN, JR., Assistant Examiner

U.S. Cl. X.R.

60—52, 545; 188—151, 170; 303—2, 9, 13, 68